United States Patent
Dhuria et al.

(10) Patent No.: US 9,529,962 B1
(45) Date of Patent: Dec. 27, 2016

(54) SYSTEM AND METHOD FOR GENERATING AND USING SIBLING NETS MODEL FOR SHARED DELAY CALCULATION ACROSS MULTI-INSTANTIATED BLOCKS IN THE CIRCUIT DESIGN

(71) Applicant: Cadence Design Systems, Inc., San Jose, CA (US)

(72) Inventors: Amit Dhuria, Uttar Pradesh (IN); Pradeep Yadav, Uttar Pradesh (IN); Manuj Verma, Uttar Pradesh (IN); Naresh Kumar, Uttar Pradesh (IN); Prashant Sethia, Uttar Pradesh (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/732,160

(22) Filed: Jun. 5, 2015

(51) Int. Cl.
*G06F 17/50* (2006.01)

(52) U.S. Cl.
CPC .................. *G06F 17/5081* (2013.01)

(58) Field of Classification Search
CPC .................. G06F 17/5045; G06F 17/5068
USPC .......................... 716/108, 113, 134
See application file for complete search history.

(56) References Cited

U.S. PATENT DOCUMENTS

| | | | | |
|---|---|---|---|---|
| 5,638,291 A * | 6/1997 | Li et al. | ............... | G06F 17/5045 714/700 |
| 5,974,245 A * | 10/1999 | Li et al. | ............... | G06F 17/5077 716/104 |
| 6,223,334 B1 * | 4/2001 | Suaris et al. | ......... | G06F 17/5077 716/122 |
| 6,836,753 B1 * | 12/2004 | Silve et al. | .......... | G06F 17/5031 703/13 |
| 7,073,149 B2 * | 7/2006 | Knol et al. | .......... | G06F 17/5072 345/649 |
| 7,117,473 B1 * | 10/2006 | Knol et al. | .......... | G06F 17/5072 716/124 |
| 7,814,451 B2 * | 10/2010 | Furnish et al. | ..... | G06F 17/5068 716/100 |
| 8,788,995 B1 | 7/2014 | Kumar et al. | | |
| 8,863,052 B1 | 10/2014 | Dhuria et al. | | |
| 2014/0040843 A1 * | 2/2014 | Postman et al. | .... | G06F 17/5068 716/112 |

OTHER PUBLICATIONS

Das et al. "A Low Cost Approach for Detecting, Locating, and Avoiding Interconnect Faults in FPGA-Based Reconfigurable Systems", Jan. 1999, IEEE Twelfth International Conference on VSLI Design, Proceedings pp. 266-269.*
Karasalo et al., "The Design of Control—A New System for Data Analysis", 1986, Swedish National Defense Research Institute, SSDBM, Research Report pp. 224-244.*

* cited by examiner

*Primary Examiner* — Sun Lin
(74) *Attorney, Agent, or Firm* — Holland & Knight LLP; Mark H. Whittenberger, Esq.

(57) ABSTRACT

The present disclosure relates to a computer-implemented method for use with an electronic design. Embodiments include identifying, using one or more processors, a plurality of sibling nets associated with the electronic design and determining if the plurality of sibling nets have a same input slew rate. If the plurality of sibling nets do not have a same input slew rate, embodiments also include determining a delay calculation (DC) for each of the plurality of sibling nets. If the plurality of sibling nets do have a same input slew rate, embodiments further include sharing a stored DC with the plurality of sibling nets.

20 Claims, 9 Drawing Sheets

US 9,529,962 B1

SYSTEM AND METHOD FOR GENERATING AND USING SIBLING NETS MODEL FOR SHARED DELAY CALCULATION ACROSS MULTI-INSTANTIATED BLOCKS IN THE CIRCUIT DESIGN

FIELD OF THE INVENTION

The present disclosure relates to electronic design methodologies, and more specifically, to a method for sharing or re-using a delay calculation between portions of an electronic design during Static Timing Analysis ("STA").

DISCUSSION OF THE RELATED ART

In the world of electronic design automation ("EDA"), many different approaches have been used in order to verify the operation of an integrated circuit ("IC"). Static timing analysis ("STA") is one particular approach that is used to assess the timing of any given digital circuit using software techniques and certain models that provide relevant characteristics of the digital circuit. Some of these input models may include netlists, library models, parasitic models, timing derates, standard delay format, system level constraints, delay calculation ("DC"), worst slack, timing reports, and multimode multi-corner analysis ("MMMC"), which are each discussed in further detail hereinbelow.

A "netlist" may refer to a model that defines the digital circuit that is being envisioned. Generally, a gate level netlist is provided as an input model to define the desired functionality. Various kinds of library models are required to perform static timing analysis. Some standard library models include Liberty format specified (".lib") library models for defining the delays of standard digital gates (e.g., AND, OR, NOT, FLOP, LATCH, etc.) and MACROS, advanced on-chip variation ("AOCV") models for performing advanced STA, models for performing SI analysis, etc. Similar to gates, for interconnects, there exist parasitic models which are generally specified in the standard parasitic exchange format ("SPEF"). Timing Derates may be used to model the variation impact generally during STA. Standard delay format is another approach which may be used to specify the input delays of gates and interconnects. System level constraints may refer to a set of input constraints that may be applied that define the desired timing that is envisioned from the digital circuit under consideration. After reading inputs, the first step that may occur is delay calculation. During this step, an STA tool receives the user inputs provided through SPEF/Library/Timing Constraints for each netlist object and generates the best and worst propagation delay of the signal flowing through each particular stage in the design. The delay calculation typically constitutes 50-60% of timing analysis runtime and therefore is a critical step in the process. After the delay calculation step, the next step an STA tool may perform involves calculating the worst slack of the design. The worst slack represents the timing state of the design. It generally refers to the amount of time by which the design is meeting or violating the timing requirements specified by the user. Using the delays computed at the delay calculation step, the timing tool may internally create a timing graph for the given netlist and then propagate the worst signal across each node of the timing graph. This worst signal is the arrival time needed by the signal to reach that particular node. The arrival time reaching at each sequential register may then be compared with the design clock to ensure if the signals could reach the capturing registers in stipulated clock period or not. If yes, then the design is considered to be compliant from a timing perspective, otherwise it may be reported as a timing violation. One output format of STA software is a set of timing reports that classify the entire design into various number of paths (e.g., subsections of digital circuits) and then identify if each path is meeting the set constraints.

Timing Closure and Signoff is no more limited to two worst corner (best and worst) analysis. Due to an increased number of process variations in lower technologies, a designer may need to signoff on various process, voltage, temperature ("PVT") conditions. Different combination of PVT may result in a large number of corners that need to be analyzed for each design. Another set of variations comes from design modes on which a particular chip is expected to run. For example, the same wireless phone chip may operate differently while receiving the call than when in stand-by mode. Each mode may be represented through a different set of input timing constraints. The same mode may again show variation across different PVT conditions. These different modes and corner runs form the Multi Mode Multi Corner ("MMMC") setup for a designer who needs to ensure that timing is intact for each of these combinations. The efficient way provided by tools available from the Assignee of the subject application involves running all of these MMMC runs into a single run and still have the capability to generate and review the timing of each MMMC setup. However, as we go on increasing the corners, the delay calculation cost keeps on increasing.

SUMMARY OF DISCLOSURE

In one or more embodiments of the present disclosure, a computer-implemented method for use with an electronic design is provided. The method may include identifying, using one or more processors, a plurality of sibling nets associated with the electronic design and determining if the plurality of sibling nets have a same input slew rate. If the plurality of sibling nets do not have a same input slew rate, the method may include determining a delay calculation for each of the plurality of sibling nets. If the plurality of sibling nets do have a same input slew rate, the method may include sharing a stored delay calculation ("DC") with the plurality of sibling nets.

One or more of the following features may be included. In some embodiments, the plurality of sibling nets may share at least one of standard parasitic exchange format ("SPEF") information, netlist structure information, and library information. The method may include storing the plurality of sibling nets in a searchable database and identifying each hierarchical cell associated with the electronic design that has a unique SPEF profile. The method may include iterating over a netlist associated with the electronic design to mark one or more SPEF siblings. The method may include storing no more than one copy of the same input slew rate. In some embodiments, sharing a stored delay calculation may include sharing with at least one of a hierarchical netlist with hierarchical SPEFs and a hierarchical netlist having flat SPEFs.

In one or more embodiments of the present disclosure a computer-readable storage medium having stored thereon instructions, which when executed by a processor result in one or more operations for use in an electronic design are provided. Operations may include identifying, using one or more processors, a plurality of sibling nets associated with the electronic design and determining if the plurality of sibling nets have a same input slew rate. If the plurality of sibling nets do not have a same input slew rate, operations may include determining a delay calculation for each of the plurality of sibling nets. If the plurality of sibling nets do have a same input slew rate, operations may include sharing a stored delay calculation ("DC") with the plurality of sibling nets.

One or more of the following features may be included. In some embodiments, the plurality of sibling nets may share at least one of standard parasitic exchange format ("SPEF") information, netlist structure information, and library information. Operations may include storing the plurality of sibling nets in a searchable database and identifying each hierarchical cell associated with the electronic design that has a unique SPEF profile. Operations may include iterating over a netlist associated with the electronic design to mark one or more SPEF siblings. Operations may include storing no more than one copy of the same input slew rate. In some embodiments, sharing a stored delay calculation may include sharing with at least one of a hierarchical netlist with hierarchical SPEFs and a hierarchical netlist having flat SPEFs.

In some embodiments, a system for electronic design verification is provided. The system may further include one or more processors configured to identify a plurality of sibling nets associated with the electronic design and determine if the plurality of sibling nets have a same input slew rate. If the plurality of sibling nets do not have a same input slew rate, the one or more processors may be further configured to determine a delay calculation for each of the plurality of sibling nets. If the plurality of sibling nets do have a same input slew rate, the one or more processors may be further configured to share a stored delay calculation ("DC") with the plurality of sibling nets.

One or more of the following features may be included. In some embodiments, the plurality of sibling nets may share at least one of standard parasitic exchange format ("SPEF") information, netlist structure information, and library information. The one or more processors may be further configured to store the plurality of sibling nets in a searchable database and identifying each hierarchical cell associated with the electronic design that has a unique SPEF profile. The one or more processors may be further configured to iterate over a netlist associated with the electronic design to mark one or more SPEF siblings. The one or more processors may be further configured to store no more than one copy of the same input slew rate. In some embodiments, sharing a stored delay calculation may include sharing with at least one of a hierarchical netlist with hierarchical SPEFs and a hierarchical netlist having flat SPEFs.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

Figure 1:
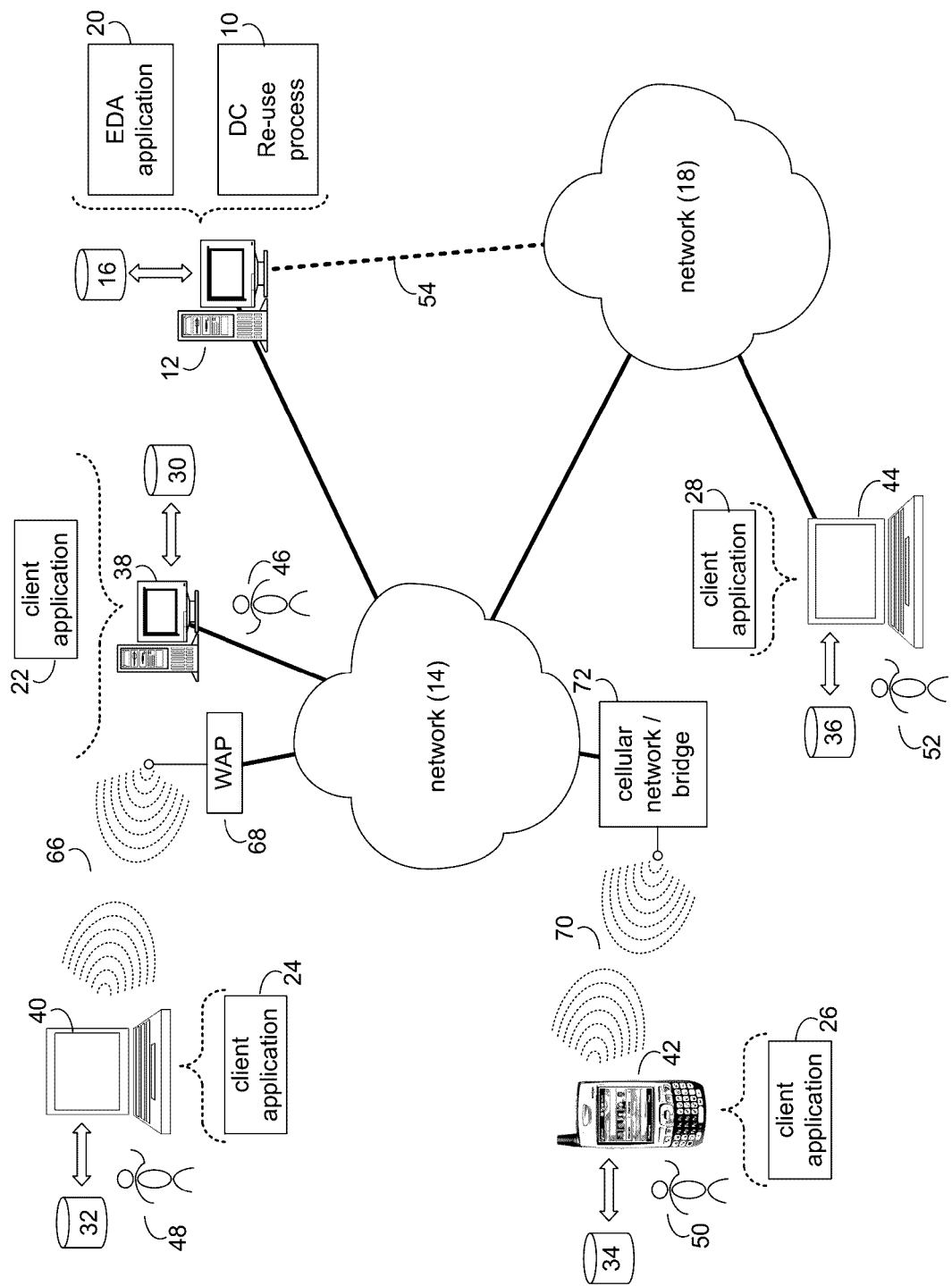
FIG. 1 is a diagram depicting an embodiment of a delay calculation re-use process in accordance with the present disclosure.

Referring to FIG. 1, there is shown a delay calculation ("DC") re-use process 10 that may reside on and may be executed by server computer 12, which may be connected to network 14 (e.g., the Internet or a local area network, etc.). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, DC re-use process 10 may reside on and be executed, in whole or in part, by a client electronic device, such as a personal computer, notebook computer, personal digital assistant, or the like.

The instruction sets and subroutines of DC re-use process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain, for example, port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization. It should be noted that EDA application 20 may be used before, during, and/or after DC re-use process 10 and may be used in accordance with any or all of the devices shown in FIG. 1, either in whole, or in part, as well as in configurations that are not shown.

DC re-use process 10 may be a stand alone application, or may be an applet/application/script that may interact with and/or be executed within EDA application 20. In addition/as an alternative to being a server-side process, DC re-use process 10 may be a client-side process (not shown) that may reside on a client electronic device (described below) and may interact with an EDA client application (e.g., one or more of EDA client applications 22, 24, 26, 28). Further, DC re-use process 10 may be a hybrid server-side/client-side process that may interact with EDA application 20 and an EDA client application (e.g., one or more of client applications 22, 24, 26, 28). As such, DC re-use process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize DC re-use process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

The term "design" as used herein may refer to, but is not limited to, an integrated circuit design, or any other suitable type of electronic design, such as those associated with electronic design automation tools. For example, an electronic design may refer to a combination of hardware (e.g. described by a hardware description language) and software to implement a range of functions. The function performed by the system may be determined by the way in which the design is configured and the data is presented to the design. Numerous designs may be simulated and any number of engines of various types may be used without departing from the scope of the present disclosure.

Typically, it is software only for an STA tool's perspective. Accordingly, a design specification may be received from the user through Verilog (or any other Hardware descriptive language HDL) and the tool may then read it to get the designer's intent for a particular design.

Figure 2:
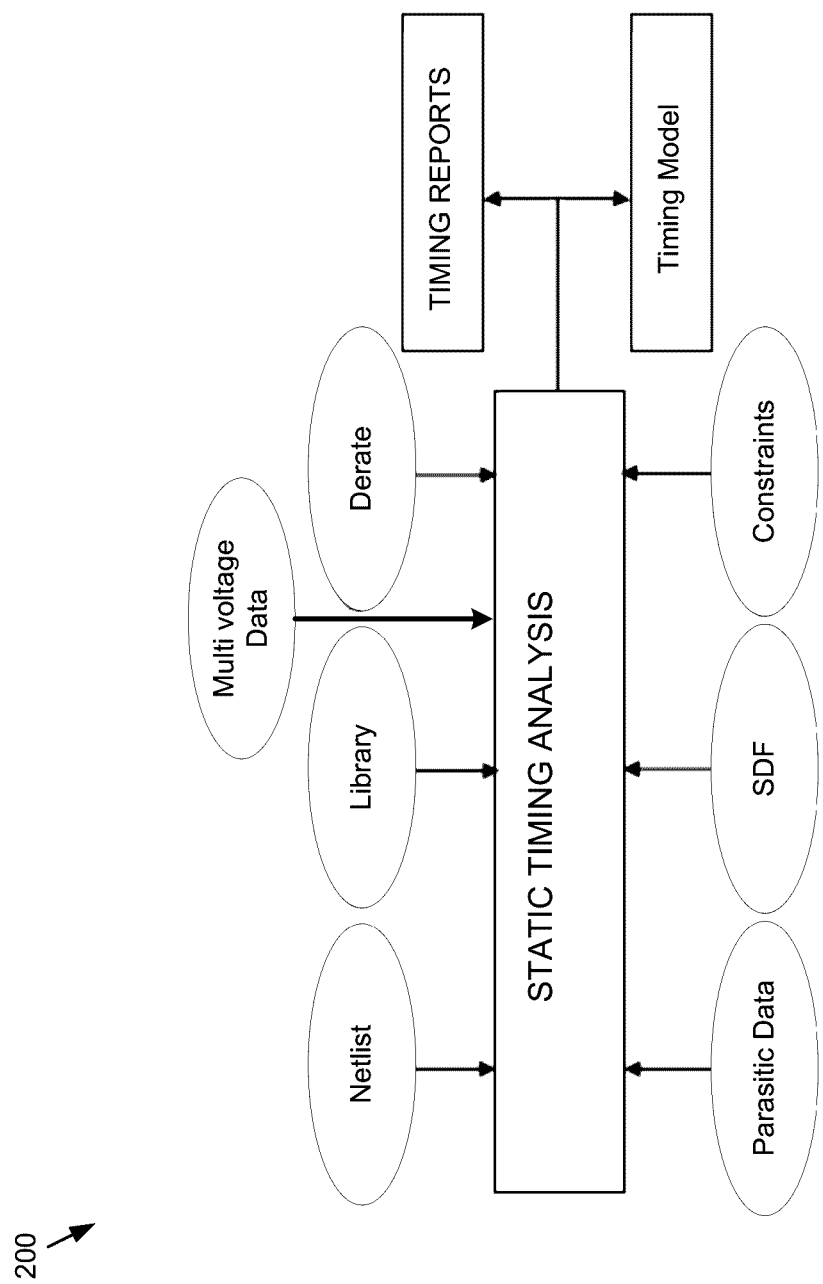
FIG. 2 is a flowchart depicting an embodiment of a delay calculation re-use process in accordance with the present disclosure.

Referring also to FIG. 2, an embodiment 200 depicting an example of the input/output flow associated with static timing analysis is provided. STA analysis may receive a number of models, some of which may include, but are not limited to, netlist, library, parasitic, SDF, constraint, multi voltage data, and timing derate models. STA may generate a number of outputs as well such as the timing reports and timing models shown in FIG. 2.

With shrinking technology and growing design sizes, building a full flat netlist has become an almost impossible task. 100+ million gate designs have become quite common and, as a result, designers have already moved to hierarchical methodologies to help alleviate design cycle turnaround time. In this way, the full chip functionality may be hierarchically divided into N different sub-functional requirements and then multiple design teams work together on modeling the specific requirements.

For better efficiency and coordination across design groups, embodiments of DC re-use process 10 may be configured to identify a set of reusable blocks that may be needed by more than one component of the design. Accordingly, there may be some components which need to be replicated more than once in full chip netlist.

Figure 3:
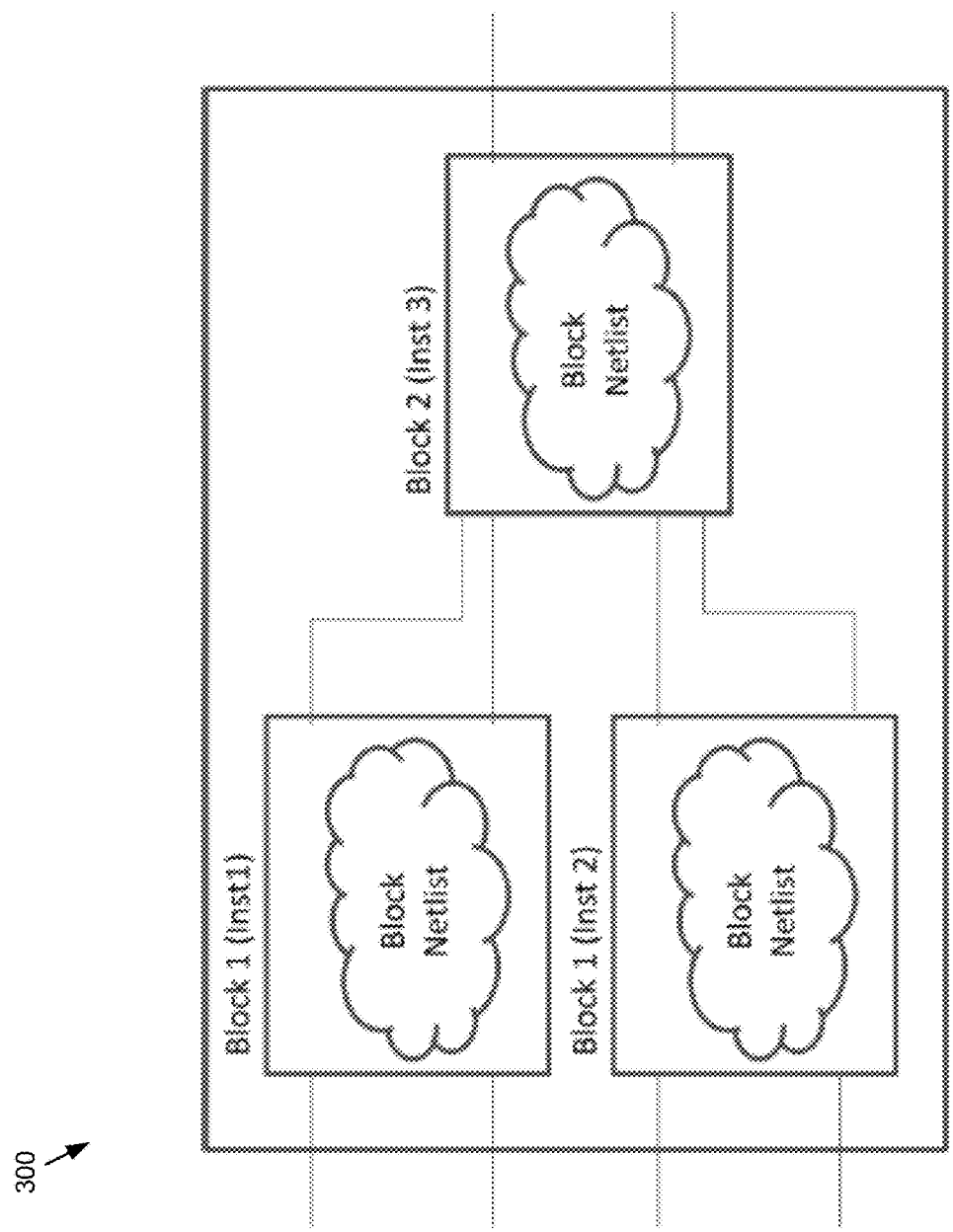
FIG. 3 is a diagram depicting an embodiment of a delay calculation re-use process in accordance with the present disclosure.

Referring now to FIG. 3, an embodiment depicting a sample hierarchical design built from two sub-blocks (i.e., Block 1 and Block 2) is provided. In this particular example, the functional requirements of the design indicated that the top level netlist required Block 1 to be instantiated more than once. Each hierarchical block may include its own netlist, constraints and SPEF information which may then be stitched together at the top level. If there are multiple instances of the same block, the internal constraints and SPEF may be exactly the same across all instances. The interface level netlist of these instances may be receiving different inputs that may depend upon their adjacent blocks and top level netlist/constraints. However, for accurate modeling and close correlation between blocks and chip level timing, designers typically attempt to ensure a similar set of inputs that are within a certain threshold or error tolerance. A review of various industry standard large scale hierarchical designs from various customers suggests significant replication of multiple hierarchical blocks at the top level netlist. These replications may be coming from reusable sub-components shared across multiple blocks and/or due to multi-instantiation of hierarchical blocks. Table 1 shown below reflects the design data across various top level hierarchical designs:

TABLE 1

| Design Name | Total Number of Nets across various blocks of the design | Total Number of Nets across multiple instances of various blocks | % Unique part of the design |
|---|---|---|---|
| Design 1 | 75167307 | 405448920 | 18.54 |
| Design 2 | 15039067 | 67690428 | 22.22 |
| Design 3 | 23984717.00 | 105812552.00 | 22.67 |
| Design 4 | 6376968 | 27948657 | 22.82 |
| Design 5 | 19196524 | 66864817 | 28.71 |
| Design 6 | 117105622 | 373699745 | 31.34 |
| Design 7 | 103187002 | 205259833 | 50.27 |
| Design 8 | 136350041 | 220119452 | 61.94 |
| Design 9 | 167432012 | 239736175 | 69.84 |
| Design 10 | 782034441 | 1077403419 | 72.59 |

The block here in this data represents a hierarchical block that has its own SPEF. For example, Table 2 provided below shows individual block data of Design 1 that has 23 blocks. The unique part suggests that block level information may be re-used in an effort to reduce full chip timing analysis time.

TABLE 2

| Block Name | #Instances | Total Number of Nets in each instance | Total Number of Nets including multiple instances of each block |
|---|---|---|---|
| Block 1 | 66 | 734378 | 48468948 |
| Block 2 | 2 | 149383 | 298766 |
| Block 3 | 2 | 49189408 | 98378816 |
| Block 4 | 2 | 137263 | 274526 |
| Block 5 | 2 | 5345259 | 10690518 |
| Block 6 | 2 | 1511547 | 3023094 |
| Block 7 | 2 | 241360 | 482720 |
| Block 8 | 4 | 638765 | 2555060 |
| Block 9 | 2 | 353269 | 706538 |
| Block 10 | 2 | 189033 | 378066 |
| Block 11 | 16 | 502728 | 8043648 |
| Block 12 | 16 | 369057 | 5904912 |
| Block 13 | 16 | 373125 | 5970000 |
| Block 14 | 64 | 183881 | 11768384 |
| Block 15 | 16 | 849033 | 13584528 |
| Block 16 | 16 | 196466 | 3143456 |
| Block 17 | 1 | 4165204 | 4165204 |
| Block 18 | 1 | 734785 | 734785 |
| Block 19 | 1 | 1659005 | 1659005 |
| Block 20 | 16 | 6044347 | 96709552 |
| Block 21 | 2 | 359840 | 719680 |
| Block 22 | 2 | 199825 | 399650 |
| Block 23 | 84 | 1040346 | 87389064 |
| Total | | 75167307 | 405448920 |
| % Unique part of the design | | | 18.54 |

The delay calculation runtime on these designs may run from several minutes to a few hours for a single analysis view while an MMMC run further elevates the problem by n-fold. With hierarchical modeling, designers have efficiently partitioned the bigger problem into smaller chunks, however, existing STA tools have not advanced to perform similar modeling. Previously, STA tools performed a flat timing analysis on the hierarchical designs which involves a separate delay calculation and timing signal propagation occurs for two instances of Block 1. This flat analysis approach of STA tools poses a huge performance overhead on the full chip timing analysis time and results in a long timing closure cycle. Additionally, process variations and complex architecture requires multiple corner and mode analysis (MMMC) and, as a result, the timing closure process has become overly exhaustive and costly.

Accordingly, embodiments of DC re-use process 10 may be configured to efficiently utilize this delay calculation information and may significantly cut down delay calculation runtime for such multi-instantiated hierarchical designs.

As used herein, the term "block" may refer to a hierarchical block that has user level SPEF provided as an input to the STA tool. The phrase "sibling nets" may refer to nets of multiple instances of the same block that are sitting at the same level (sharing SPEF/netlist structure and library cell information). The phrase "sibling nodes" may refer to timing graph nodes of multiple instances of the same block that are sitting at the same level. The phrase "sibling stages" may refer to delay calculation stages of multiple instances of the same block that are sitting at the same level.

Figure 4:
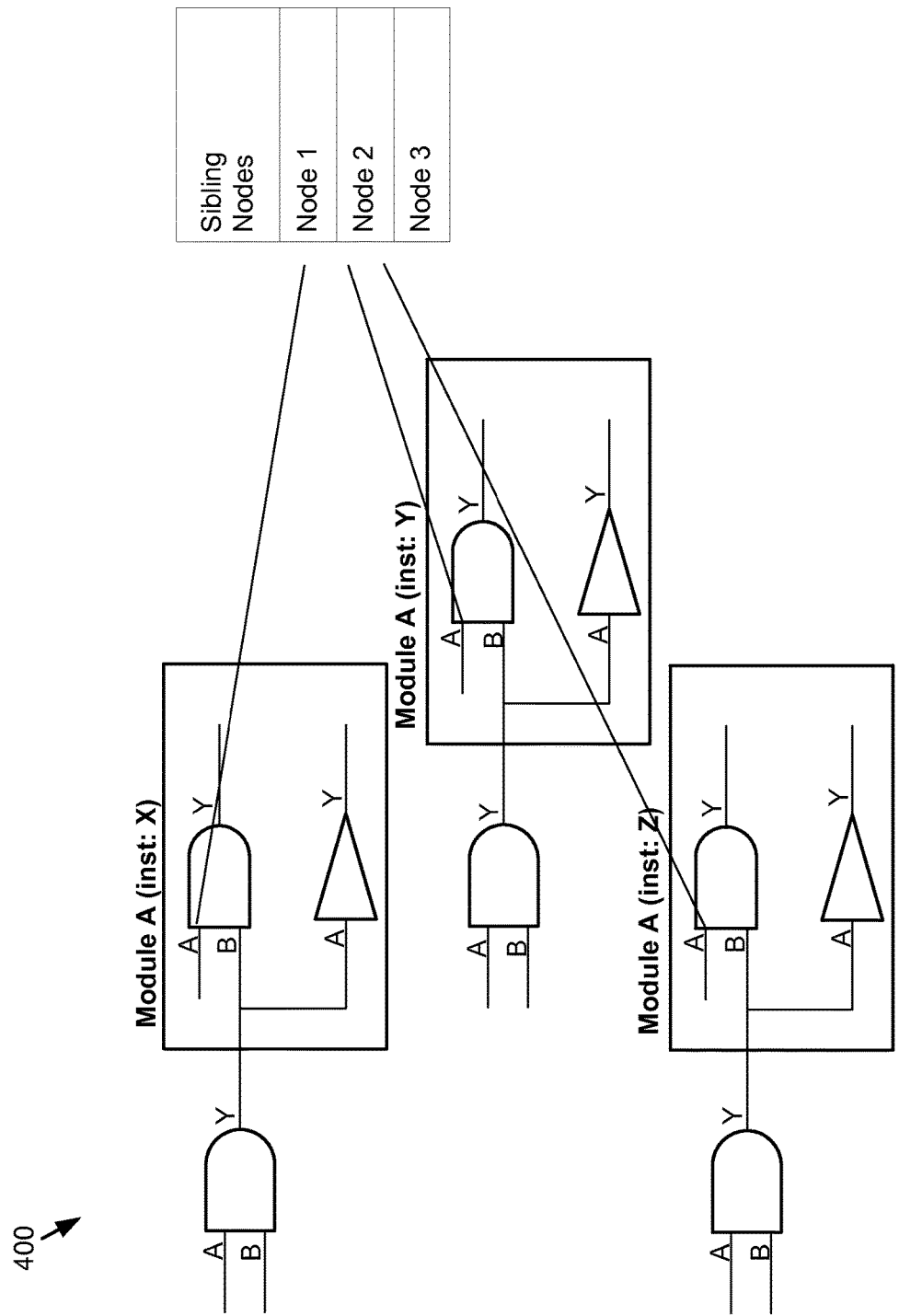
FIG. 4 is a diagram depicting an embodiment of a delay calculation re-use process in accordance with the present disclosure.
Figure 5:
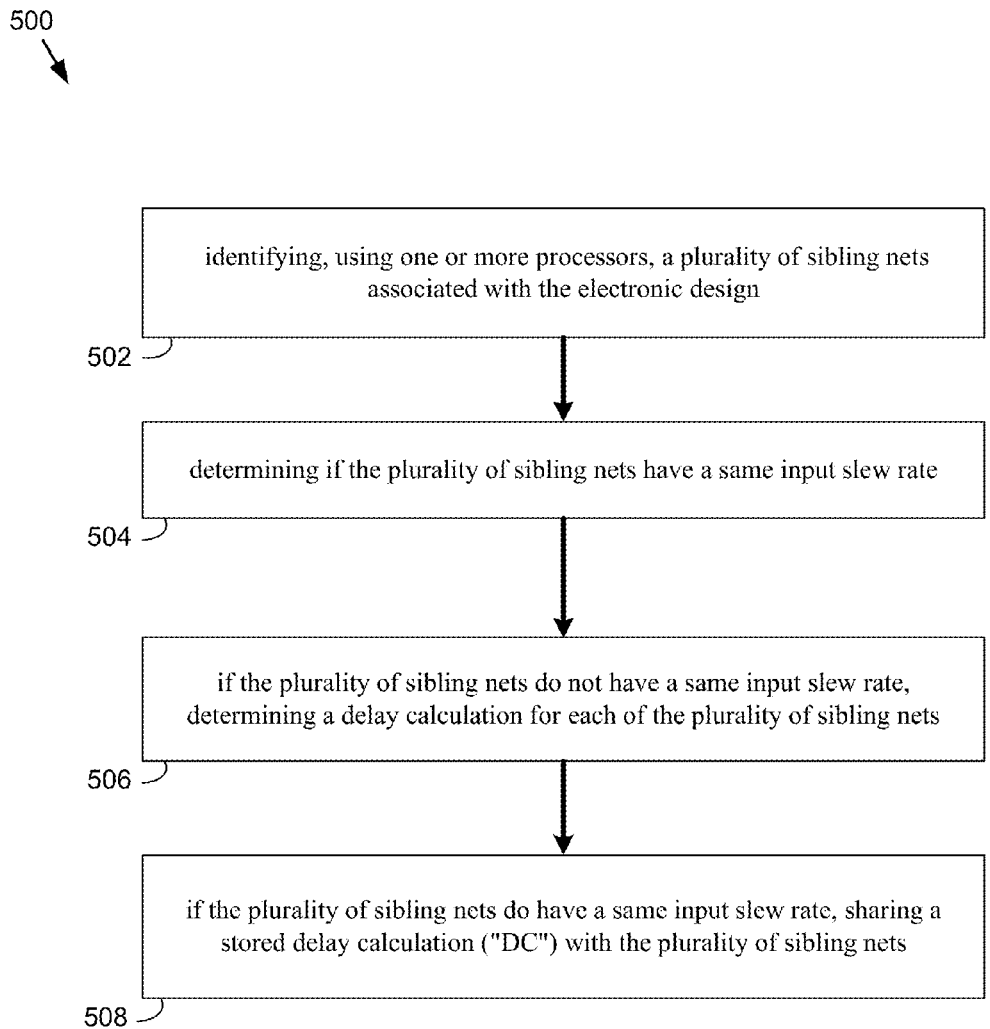
FIG. 5 is a diagram depicting an embodiment of a delay calculation re-use process in accordance with the present disclosure.

Referring now to FIG. 4, an embodiment 400 consistent with DC re-use process 10 is provided. In this particular example, multiple instances of module A are shown. The multiple instances of these blocks may be either sitting in parallel to each other or differently positioned at the chip level. Since each is a derivation of the same hierarchical block there may be significant overlap from a delay calculation perspective. Sibling nets of these blocks that are sharing SPEF/netlist structure/library information across multiple instances may have a significant likelihood of sharing the same delays at each timing stage. It should be noted that one of the primary identifiable differences involves the input slew of the sibling nodes across sibling stages. Accordingly, DC re-use process 10 may include identifying (502) a plurality of sibling nets associated with the electronic design and determining (504) if the plurality of sibling nets have a same input slew rate. If the plurality of sibling nets do not have a same input slew rate, DC re-use process 10 may include determining (506) a delay calculation for each of the plurality of sibling nets. If the plurality of sibling nets do have a same input slew rate, DC re-use process 10 may include sharing (508) a stored delay calculation ("DC") with the plurality of sibling nets. In this way, embodiments of DC re-use process 10 may provide a significant performance enhancement for STA on hierarchical designs particularly in a C-MMMC environment as it may be configured to reduce the number of hours of STA flow runtime.

An experiment was performed to compare the first signal integrity iteration input slew of various sibling nets of randomly selected hierarchical blocks. The results collated across various in-house hierarchical designs suggest that a large percentage of sibling stages have the same slews as shown in Table 3.

TABLE 3

| Design Name | Block Name | # Blocks | Total Number of Nets in each block | Total Number of Nets including multiple instances of each block | % of Stages having different slews at input pins across siblings |
|---|---|---|---|---|---|
| Design 1 | Block 11 | 16 | 502728 | 8043648 | 0.28 |
| | Block 20 | 16 | 6044347 | 96709552 | 0.09 |
| Design 3 | Block 1 | 16 | 3161872 | 50589952 | 0.45 |
| | Block 3 | 6 | 6879951 | 41279706 | 0.21 |
| Design 6 | Block 16 | 2 | 3747128 | 7494256 | 0.11 |
| | Block 17 | 2 | 2885659 | 5771318 | 0.25 |
| Design 7 | Block 3 | 8 | 2896963 | 23175704 | 0.21 |
| | Block 4 | 8 | 2890725 | 23125800 | 0.21 |

Another difference can come from different constraints present at each sibling, however, this is unlikely based upon the various in-house customer designs evaluated for this purpose. The results of these experiments confirm that a reduction of at least 60% in delay calculation runtime on designs that include approximately 20% unique parts may be achieved.

Figure 6:
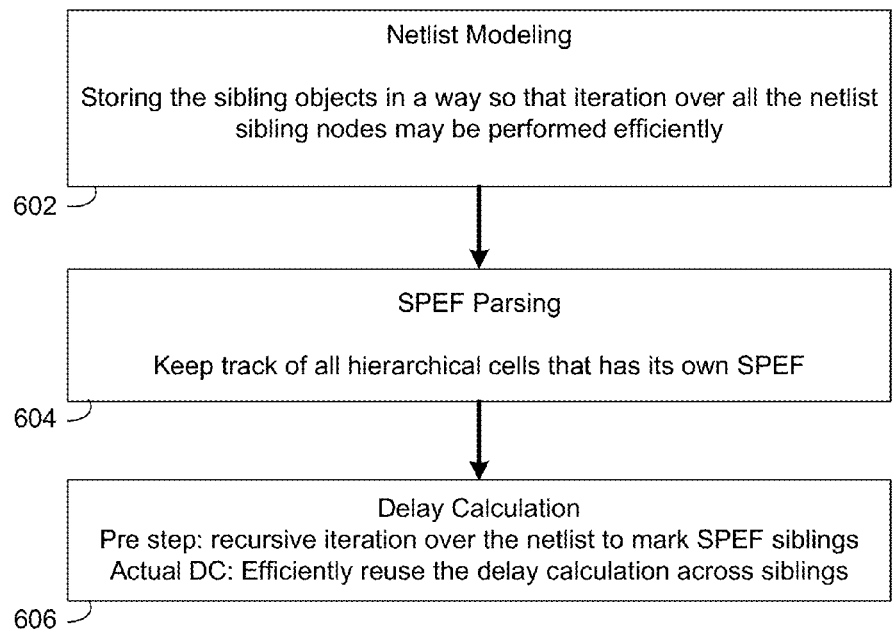
FIG. 6 is a flowchart depicting an embodiment of a delay calculation re-use process in accordance with the present disclosure.

Embodiments of DC re-use process 10 may be used to build an efficient infrastructure in order to provide quick access to sibling objects. Accordingly, DC re-use process 10 may be configured to identify sibling nets that can share a delay calculation. Referring now to FIG. 6, an embodiment of DC re-use process 10, which may be configured to efficiently identify multi-instantiated blocks is provided. As shown in FIG. 6, this may include, but is not limited to, netlist modeling, SPEF parsing, and delay calculation operations. Netlist modeling may involve storing the sibling objects so that iteration over all the netlist sibling nodes may be performed efficiently. SPEF parsing may involve identifying and storing all of the hierarchical cells that have their own SPEF information. In some embodiments, the delay calculation may involve a preliminary step of recursive iteration over the netlist to mark SPEF siblings as well as the actual delay calculation itself, which may be configured to efficiently reuse the delay calculation across siblings.

Figure 7:
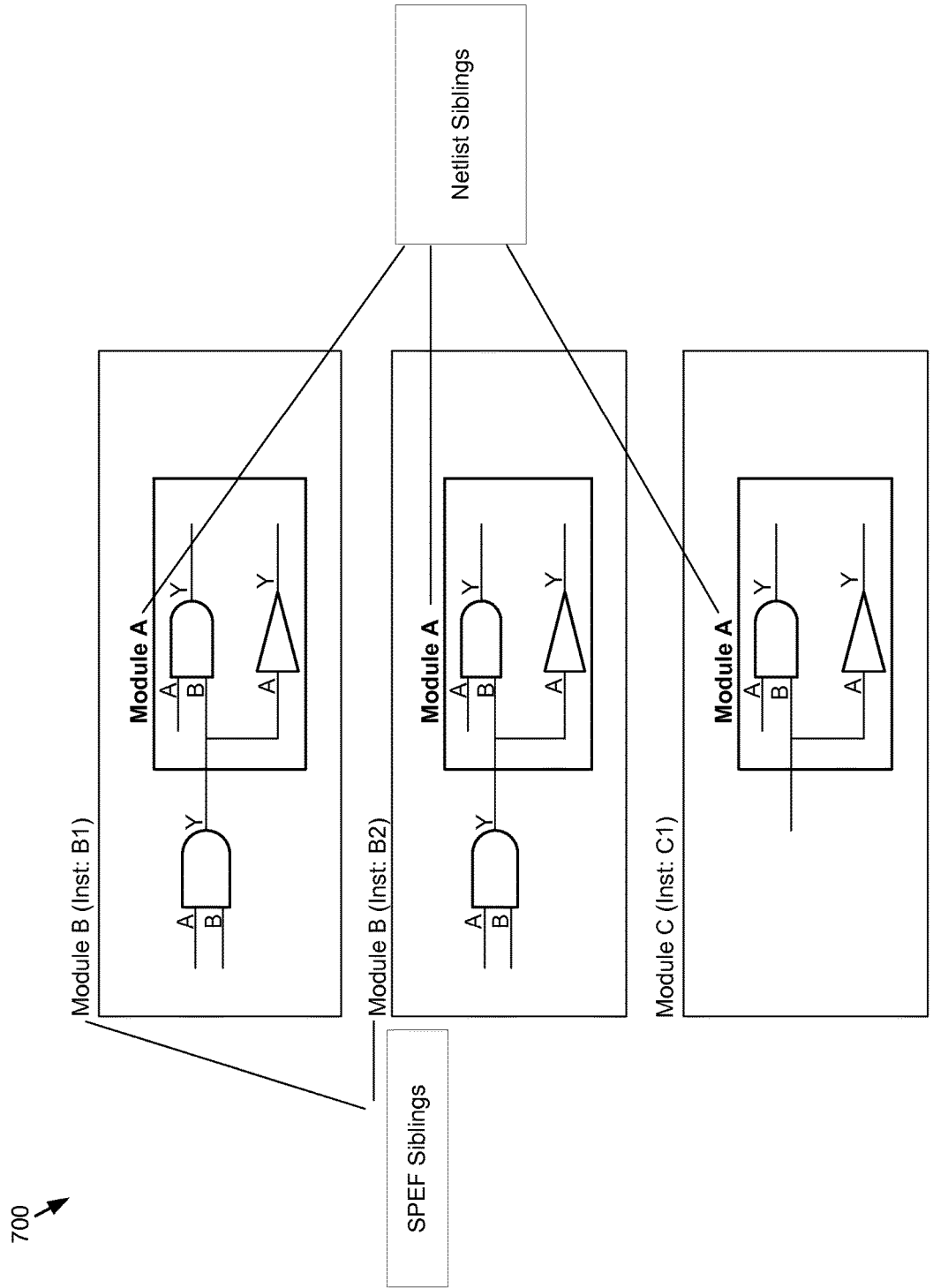
FIG. 7 is a diagram depicting an embodiment of a delay calculation re-use process in accordance with the present disclosure.

Referring now to FIG. 7, an embodiment consistent with DC re-use process 10 depicting both netlist siblings and SPEF siblings is provided. In this particular example, the netlist has three siblings of Module A. However, suppose the SPEF specification is at module B and C levels, then only two instances of module A (that are contained inside module B) may be considered as SPEF siblings. As module C is not sharing SPEF with module B none of the cells contained inside module C may share delay calculation with module B.

In some embodiments, netlist level siblings may be implicitly built by building connectivity across all sibling hierarchical cells during netlist creation. This information may be stored in a searchable database and DC re-use process 10 may provide efficient iterators that can review the sibling hierarchy to access the sibling object information.

Figure 8:
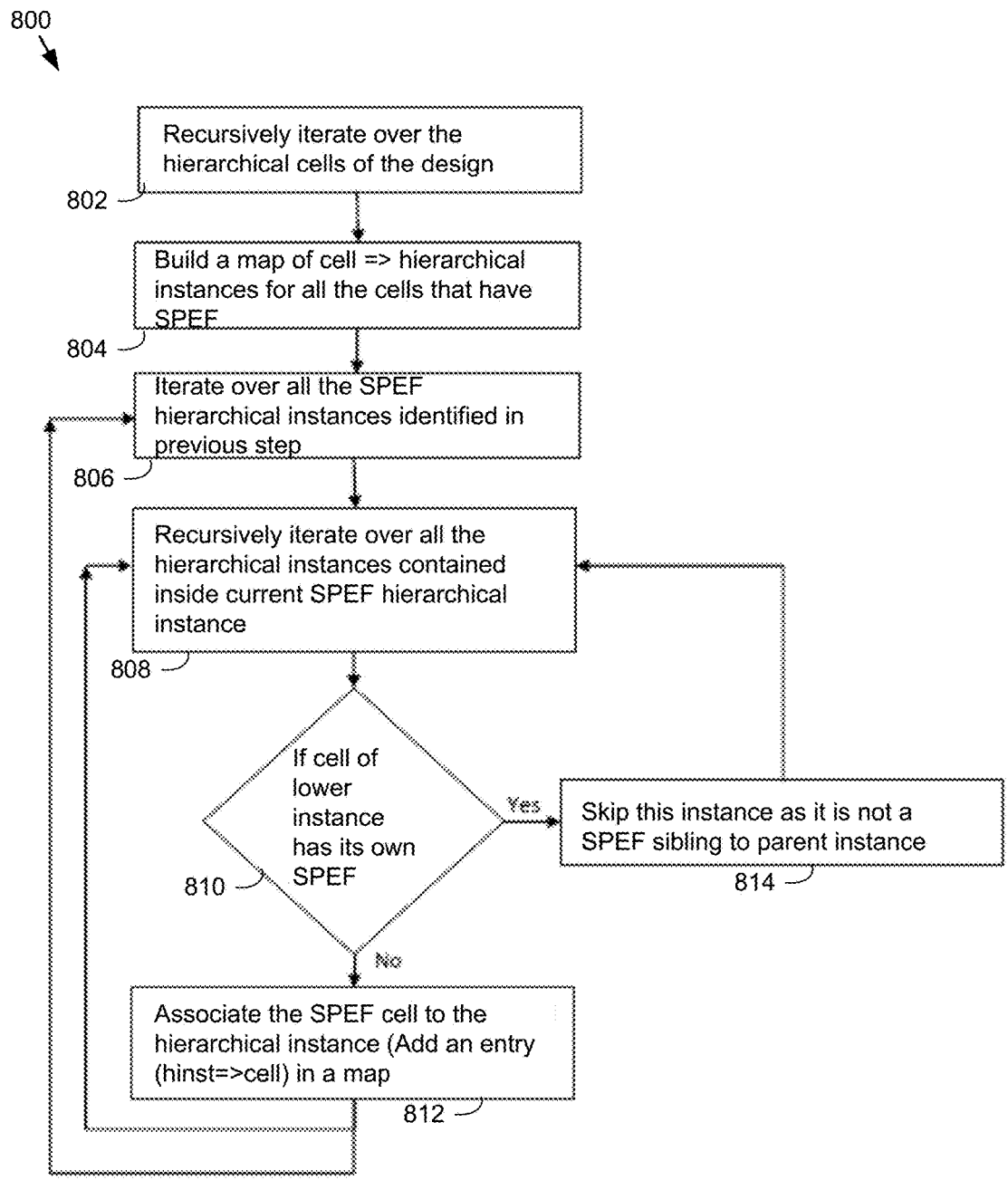
FIG. 8 is a diagram depicting an embodiment of a delay calculation re-use process in accordance with the present disclosure.

Referring now to FIG. 8, a flowchart 800 depicting an example for generating SPEF level sibling information is provided. In this way, and in addition to netlist siblings, SPEF level filtered sibling information may be generated by, for example, identifying hierarchical instances of cells that have the same SPEF information. Accordingly, this may involve recursively iterating (802) over the hierarchical cells of the design. Generating (804) a map of the cell (e.g., hierarchical instances for all the cells that have SPEF). Iterating (806) over all of the SPEF hierarchical instances identified in the previous step. Recursively iterating (808) over all of the hierarchical instances contained inside the current SPEF hierarchical instance. Determining (810) if the cell of the lower instance has its own SPEF. If not, associating (812) the SPEF cell to the hierarchical instance (e.g. adding an entry (hinst=>cell) in a map. If the cell of the lower instance does have its own SPEF, skipping (814) the instance as it is not an SPEF sibling to the parent instance.

Figure 9:
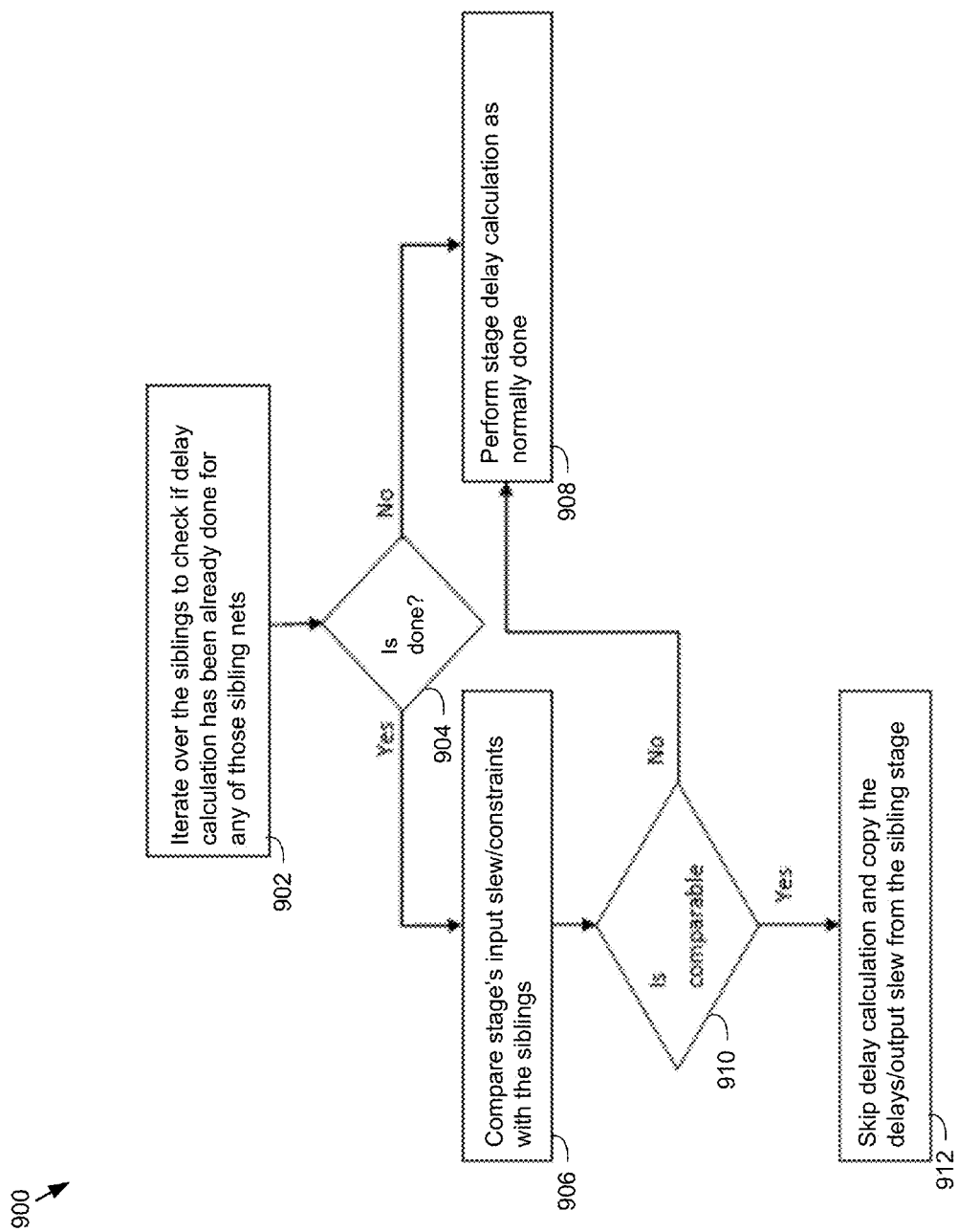
FIG. 9 is a diagram depicting an embodiment of a delay calculation re-use process in accordance with the present disclosure.

Embodiments of DC re-use process 10 may be configured to re-use a delay calculation for nets having the same inputs (e.g., slew/matching constraints). Referring now to FIG. 9, a flowchart 900 is provided, which depicts an example process for re-using the delay calculation across siblings. This approach works well for all delay calculation technologies. Some of which may include, but are not limited to, Base and signal integrity "SI" for slope based delay calculation, non-linear delay modeling "NLDM", effective current source model "ECSM", and statistical on-chip variation "SOCV". The process may include iterating (902) over the siblings to check if the delay calculation has been performed for any of those sibling nets. The process may further include determining (904) whether the DC has been performed. If so, the process may include comparing (906) the stage's input slew and/or constraint information with the siblings. If not, the process may include performing (908) a typical, full stage delay calculation. The process may further include determining (910) if the stage's input slew and/or constraints are comparable with the siblings. If so, the delay calculation may be skipped (912) and the delays/output slew from the sibling stage may be copied/shared.

Embodiments of DC re-use process 10 may be configured to optimize slew/delay storage in the timing graph for multi-instantiated blocks. At the time of storing the slew and delays of the stage it is known whether the stage is going to share the delays with its sibling, as such, memory optimization may also be performed. For example, by storing the reference to the original block instead of duplicating the data this may reduce the memory requirement. For example, a design having 20% uniqueness may only require 20% in storage capacity to store the delays/slews for the complete design.

Embodiments of DC re-use process 10 may be used in accordance with hierarchical netlists having a flat SPEF. Additionally and/or alternatively, embodiments included herein may allow for the reuse of delay calculation data for a hierarchical netlist having hierarchical SPEFs. It should be noted that the same approach may be extended to hierarchical netlists having flat SPEFs. In such cases, it may be necessary to optimally compare the exact RC data of sibling nets to decide if DC can be shared across those nets.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosure. Some hardware description languages may include, but are not limited to, Verilog, VHDL, SystemC, SystemVerilog and Verilog-AMS. Various other hardware description languages may also be used as well.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for use with an electronic design, the method comprising:
    identifying, using one or more processors, a plurality of sibling nets associated with the electronic design;
    determining if the plurality of sibling nets have a same input slew rate;
    if the plurality of sibling nets do not have a same input slew rate, determining a delay calculation (DC) for each of the plurality of sibling nets; and
    if the plurality of sibling nets do have a same input slew rate, sharing a stored DC with the plurality of sibling nets.

2. The computer-implemented method of claim 1, wherein the plurality of sibling nets share at least one of standard parasitic exchange format (SPEF) information, netlist structure information, and library information.

3. The computer-implemented method of claim 1, further comprising:
    storing the plurality of sibling nets in a searchable database.

4. The computer-implemented method of claim 1, further comprising:
    identifying each hierarchical cell associated with the electronic design that has a unique SPEF profile.

5. The computer-implemented method of claim 4, further comprising:
    iterating over a netlist associated with the electronic design to mark one or more SPEF siblings.

6. The computer-implemented method of claim 1, further comprising:
    storing no more than one copy of the same input slew rate.

7. The computer-implemented method of claim 1, wherein the sharing a stored DC includes sharing with at least one of a hierarchical netlist with hierarchical SPEFs and a hierarchical netlist having flat SPEFs.

8. A non-transitory computer-readable storage medium having stored thereon instructions that, when executed by a machine, cause the machine to perform operations for use with an electronic design, the operations comprising:
    identifying, using one or more processors, a plurality of sibling nets associated with the electronic design;
    determining if the plurality of sibling nets have a same input slew rate;
    if the plurality of sibling nets do not have a same input slew rate, determining a delay calculation (DC) for each of the plurality of sibling nets; and
    if the plurality of sibling nets do have a same input slew rate, sharing a stored delay calculation (DC) with the plurality of sibling nets.

9. The non-transitory computer-readable storage medium of claim 8, wherein the plurality of sibling nets share at least one of standard parasitic exchange format ("SPEF") information, netlist structure information, and library information.

10. The non-transitory computer-readable storage medium of claim 8, further comprising:
    storing the plurality of sibling nets in a searchable database.

11. The non-transitory computer-readable storage medium of claim 8, further comprising:
    identifying each hierarchical cell associated with the electronic design that has a unique SPEF profile.

12. The non-transitory computer-readable storage medium of claim 11, further comprising:
    iterating over a netlist associated with the electronic design to mark one or more SPEF siblings.

13. The non-transitory computer-readable storage medium of claim 8, further comprising:
    storing no more than one copy of the same input slew rate.

14. The non-transitory computer-readable storage medium of claim 8, wherein the sharing a stored DC includes sharing with at least one of a hierarchical netlist with hierarchical SPEFs and a hierarchical netlist having flat SPEFs.

15. A system for use with an electronic design, the system comprising:
    one or more processors configured to identify a plurality of sibling nets associated with the electronic design and determine if the plurality of sibling nets have a same input slew rate, and if the plurality of sibling nets do not have a same input slew rate, the one or more processors further configured to determine a delay calculation (DC) for each of the plurality of sibling nets, and if the plurality of sibling nets do have a same input slew rate, the one or more processors further configured to share a stored (DC) with the plurality of sibling nets.

16. The system of claim 15, wherein the plurality of sibling nets share at least one of standard parasitic exchange format (SPEF) information, netlist structure information, and library information.

17. The system of claim 15, wherein the one or more processors are further configured to store the plurality of sibling nets in a searchable database.

18. The system of claim 15, wherein the one or more processors are further configured to identify each hierarchical cell associated with the electronic design that has a unique SPEF profile.

19. The system of claim 18, wherein the one or more processors are further configured to iterate over a netlist associated with the electronic design to mark one or more SPEF siblings.

20. The system of claim 15, wherein the one or more processors are further configured to store no more than one copy of the same input slew rate.

* * * * *